Figure 1:
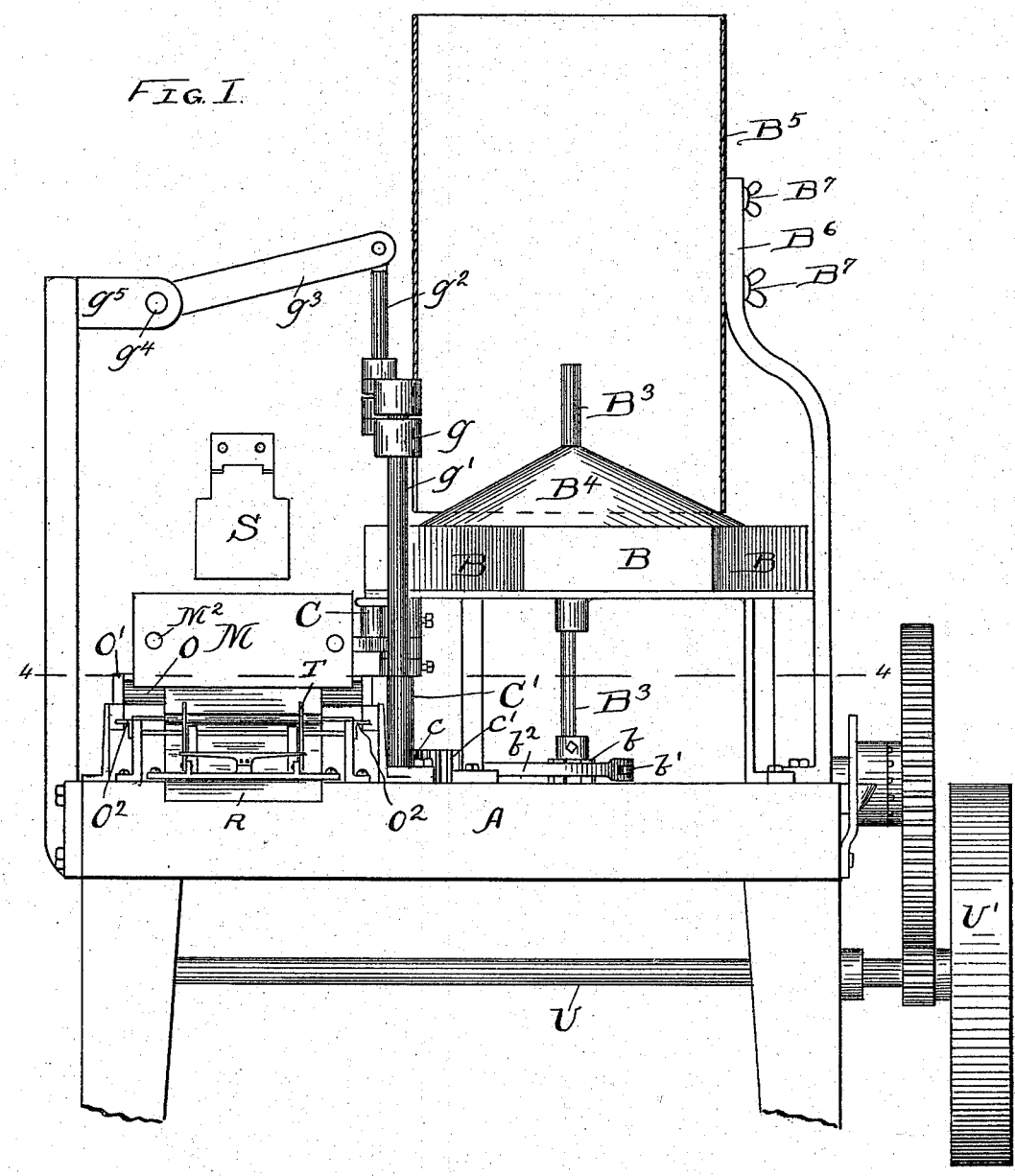

(No Model.) 9 Sheets—Sheet 1.

H. JERSTRUM.
CIGAR BUNCH MACHINE.

No. 528,166. Patented Oct. 30, 1894.

FIG. I.

WITNESSES:
Geo. E. Curtis
A. W. Munday

INVENTOR.
Herbert Jerstrum.
By Munday, Evarts & Adcock,
HIS ATTORNEYS (No Model.) 9 Sheets—Sheet 3.

H. JERSTRUM.
CIGAR BUNCH MACHINE.

No. 528,166. Patented Oct. 30, 1894.

WITNESSES:

INVENTOR:
Herbert Jerstrum.
By Munday, Evarts & Adcock.
HIS ATTORNEYS.

(No Model.) 9 Sheets—Sheet 5.

H. JERSTRUM.
CIGAR BUNCH MACHINE.

No. 528,166. Patented Oct. 30, 1894.

WITNESSES:
Geo. E. Curtis
H. W. Munday

INVENTOR:
Herbert Jerstrum.
BY Munday, Evarts & Adcock.
HIS ATTORNEYS.

(No Model.)  9 Sheets—Sheet 6.
H. JERSTRUM.
CIGAR BUNCH MACHINE.
No. 528,166.  Patented Oct. 30, 1894.
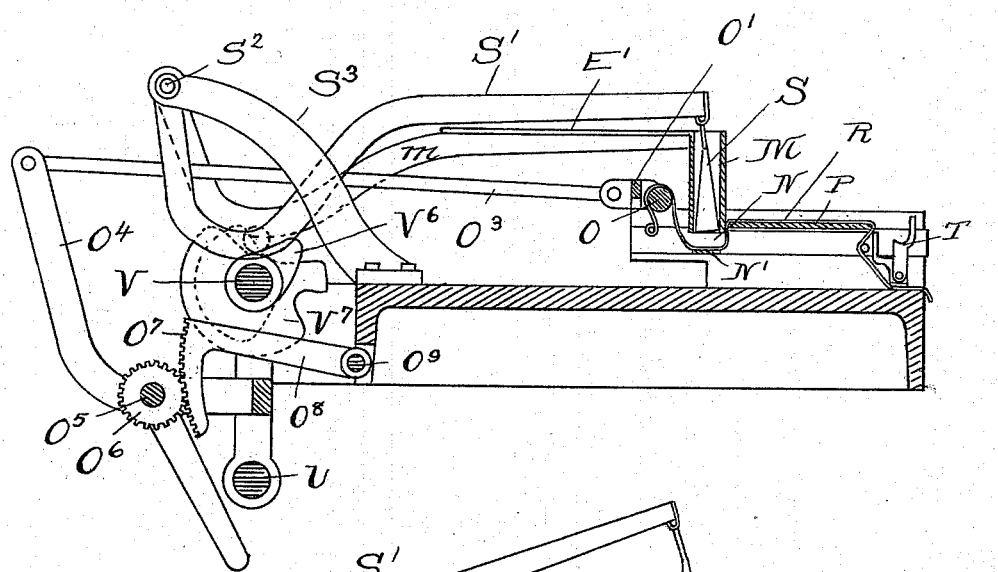
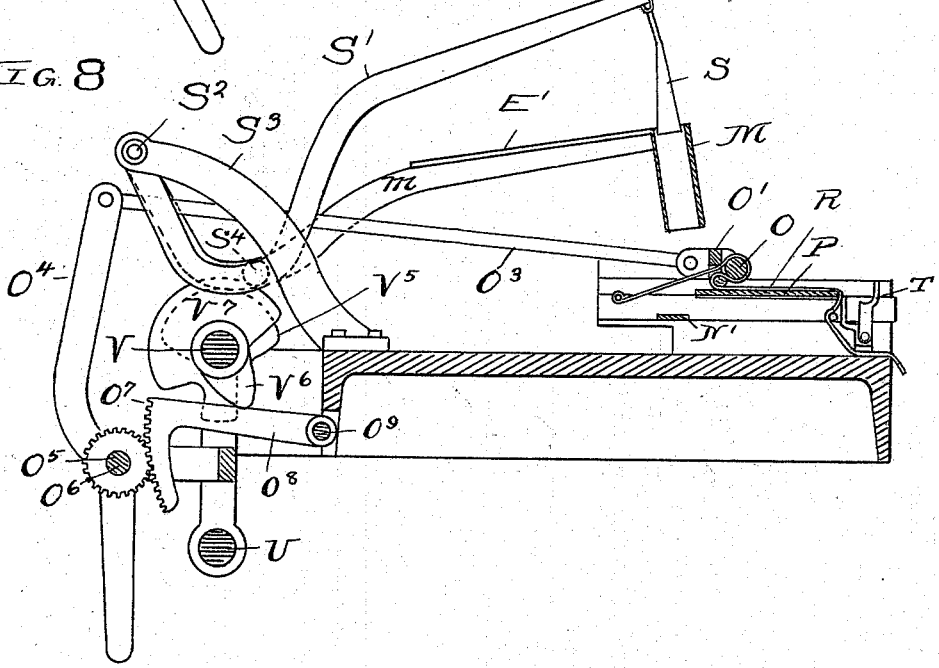
WITNESSES:
Sew. E. Curtis
N. M. Munday
INVENTOR:
Herbert Jerstrum.
BY Munday, Evarts & Adcock.
HIS ATTORNEYS (No Model.) 9 Sheets—Sheet 7.

H. JERSTRUM.
CIGAR BUNCH MACHINE.

No. 528,166. Patented Oct. 30, 1894.

WITNESSES:
Geo. E. Curtis
H. W. Munday

INVENTOR:
Herbert Jerstrum.
BY Munday, Evarts & Adcock.
HIS ATTORNEYS (No Model.) 9 Sheets—Sheet 8.
H. JERSTRUM.
CIGAR BUNCH MACHINE.
No. 528,166. Patented Oct. 30, 1894.
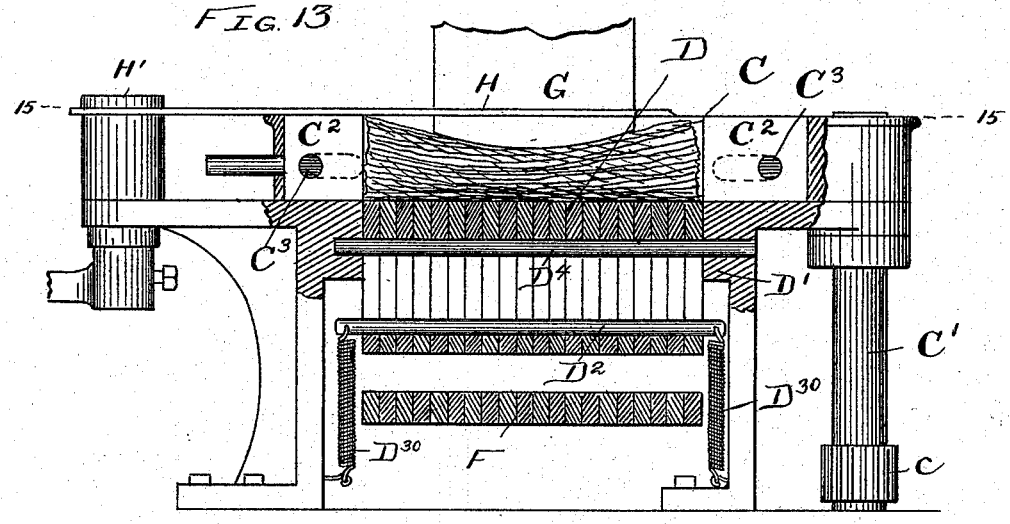
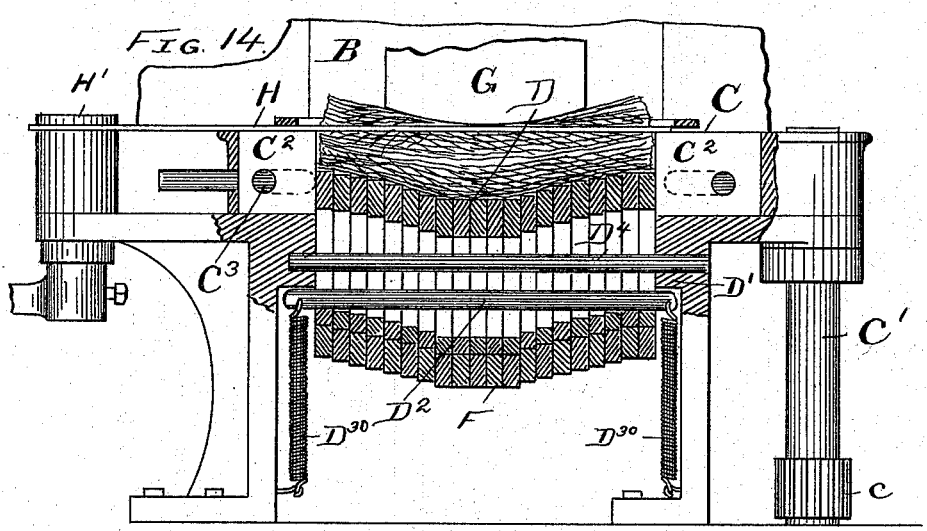
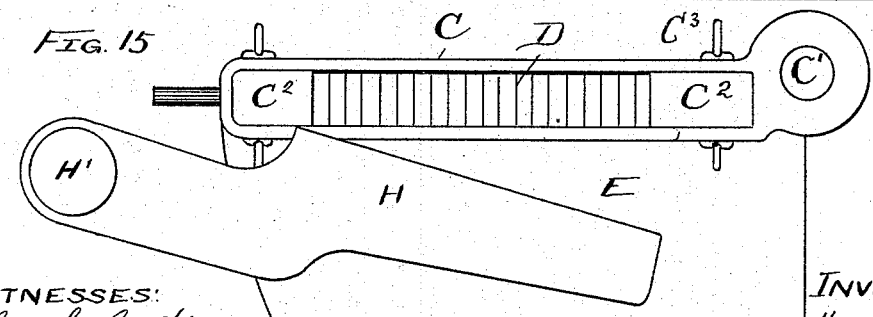
WITNESSES:
INVENTOR:
HIS ATTORNEYS.

(No Model.)
H. JERSTRUM.
CIGAR BUNCH MACHINE.
No. 528,166.
9 Sheets—Sheet 9.
Patented Oct. 30, 1894.
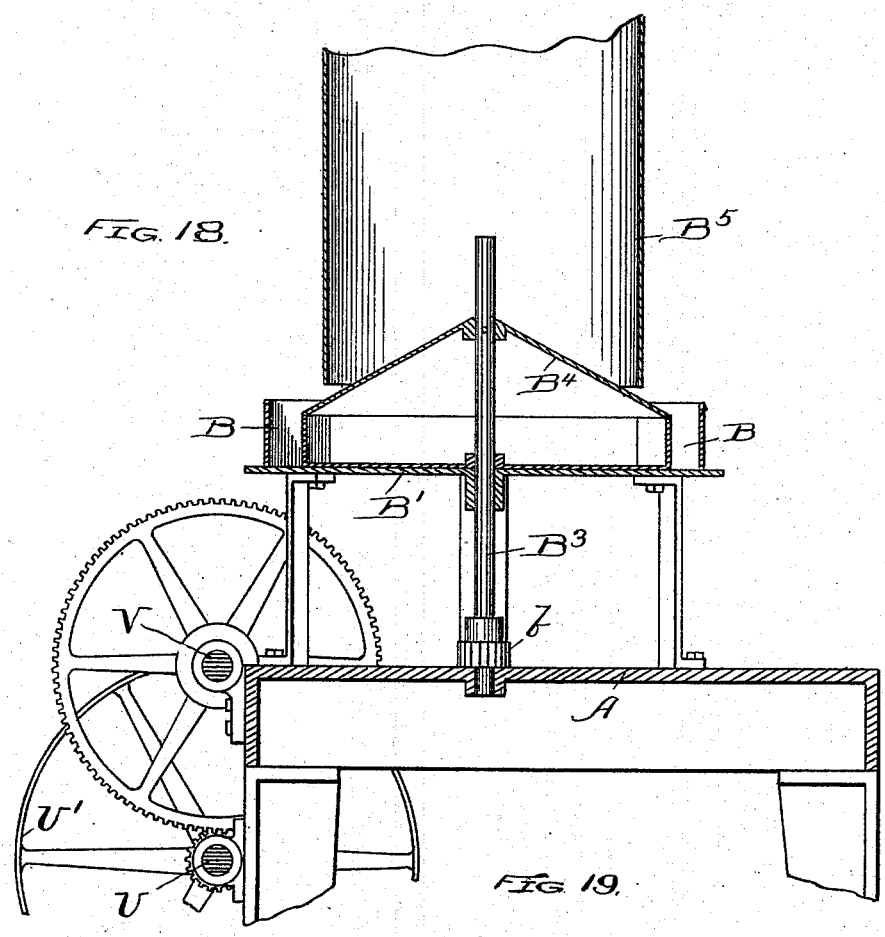
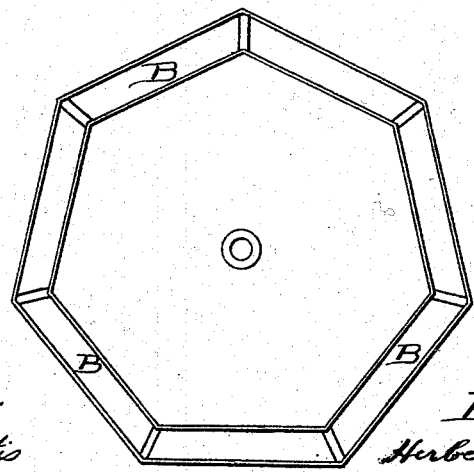

UNITED STATES PATENT OFFICE.

HERBERT JERSTRUM, OF CHICAGO, ILLINOIS, ASSIGNOR OF ONE-HALF TO HERBERT A. STREETER, OF SAME PLACE.

CIGAR-BUNCH MACHINE.

SPECIFICATION forming part of Letters Patent No. 528,166, dated October 30, 1894.

Application filed March 2, 1894. Serial No. 502,076. (No model.)

*To all whom it may concern:*

Be it known that I, HERBERT JERSTRUM, a citizen of the United States, residing in Chicago, in the county of Cook and State of Illinois, have invented a new and useful Improvement in Cigar-Bunch Machines, of which the following is a specification.

My invention relates to improvements in cigar bunch machines.

The object of my invention is to provide a cigar bunch machine of an efficient, simple and durable construction, which will operate upon long or short fillers, and by means of which the cigar bunch may be automatically given the proper tapering form toward each end of the cigar without increasing the density of the filler or material at the ends of the cigar, the machine operating to put a greater quantity of material at the middle or belly portion of the cigar where it should be larger in diameter, and a less quantity toward the two ends, so that when the wrapper is afterward applied the cigar will have the proper tapering form.

The machine I have devised comprises in combination and co-operative arrangement the following principal parts or elements: a revolving feed hopper into which the filler may be placed automatically or by hand, there being preferably a number or series of such hoppers revolving intermittently; a movable charger; a movable sectional bottom for such charger; a plunger to force the tobacco from the hopper into the charger; a knife to sever the charge of tobacco from the surplus tobacco in the hopper, the surface of the movable sectional bottom of the charger being curved or bellied at the time the knife operates in order to give the cigar bunch the proper tapering or bellied shape; a table or shelf over which the movable charger swings; a guide to guide the filler charge from the charger into the apron; a discharger to force the filler charge from the charger through the guide into the apron; the rolling table; the rolling apron; the bunching roller; the cavity for the sag or pocket of the apron; and a rest or device for receiving the finished bunch as it is discharged from the rolling apron; in connection with suitable mechanism for imparting the necessary movement in proper time to these various parts or elements; and my invention consists in the novel construction of parts or elements and novel combinations of parts or elements herein shown and described and more particularly pointed out in the claims.

Figure 2:
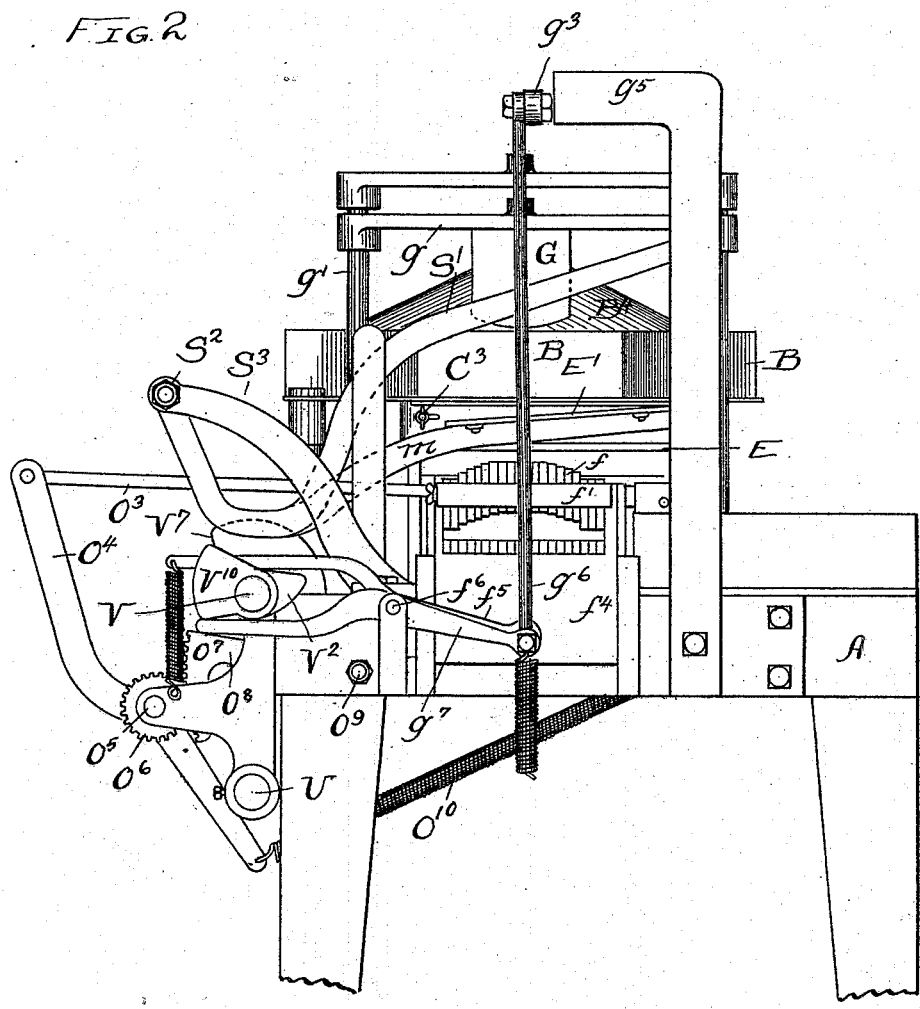
Figure 3:
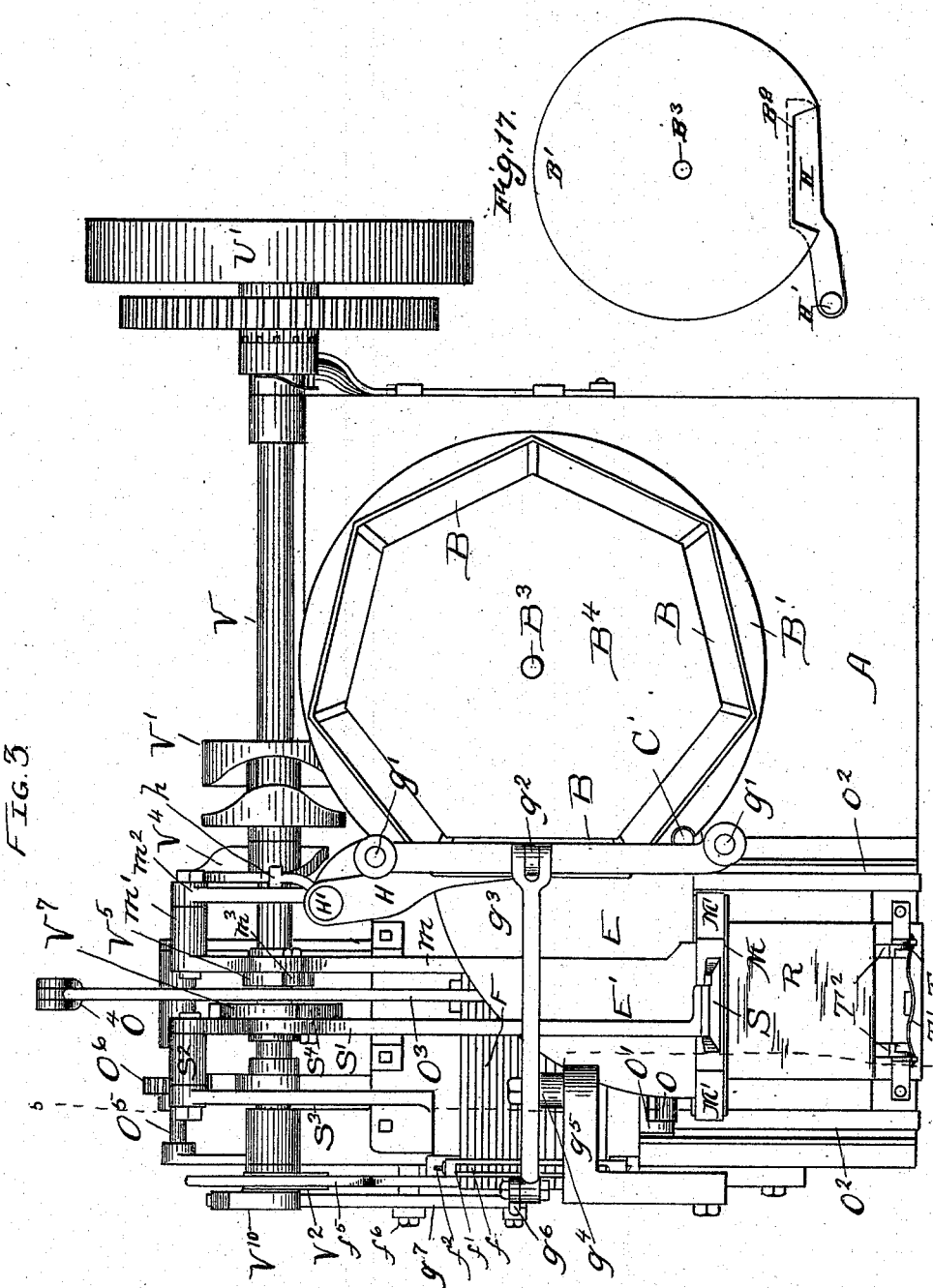
Figure 4:
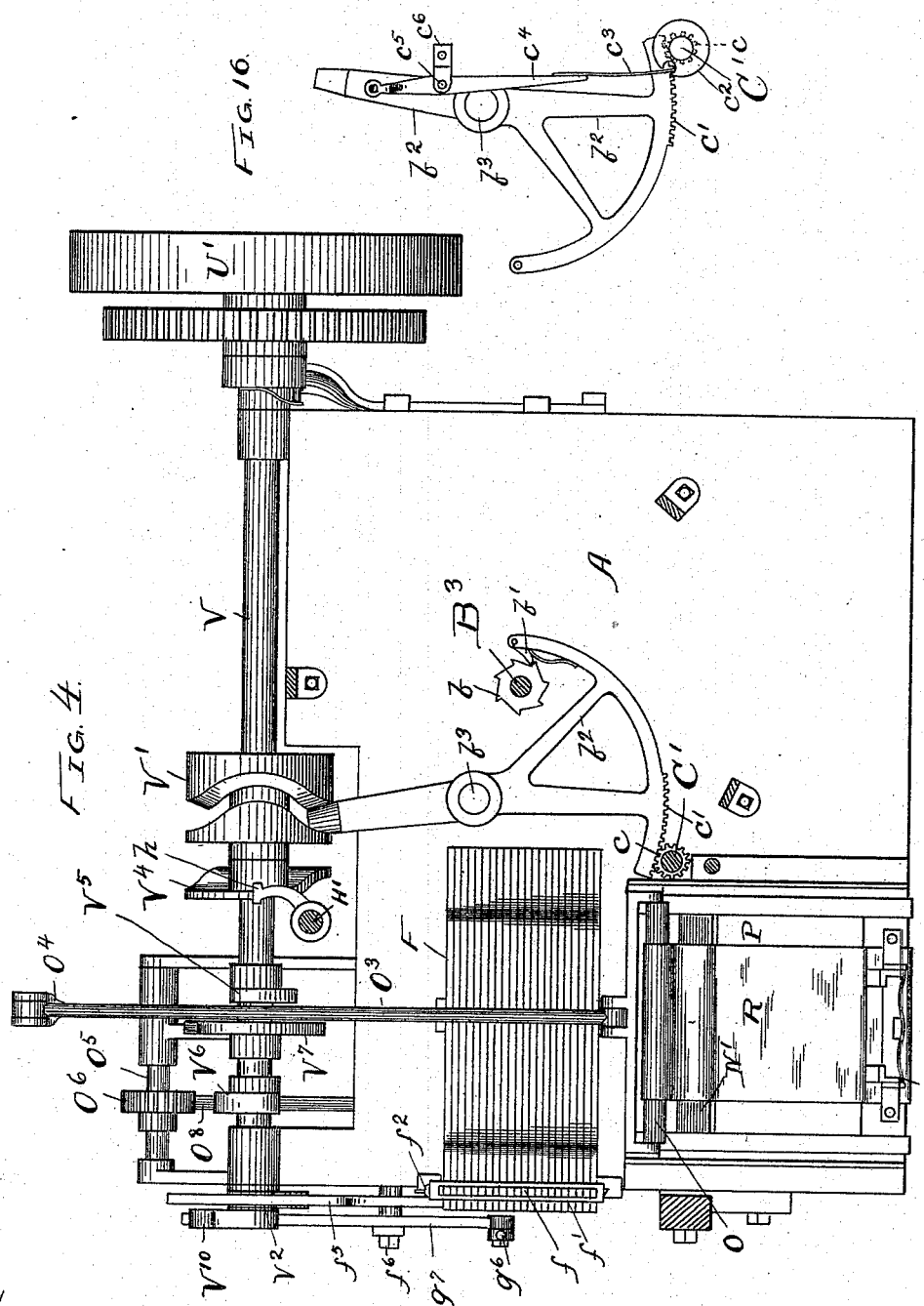
Figure 5:
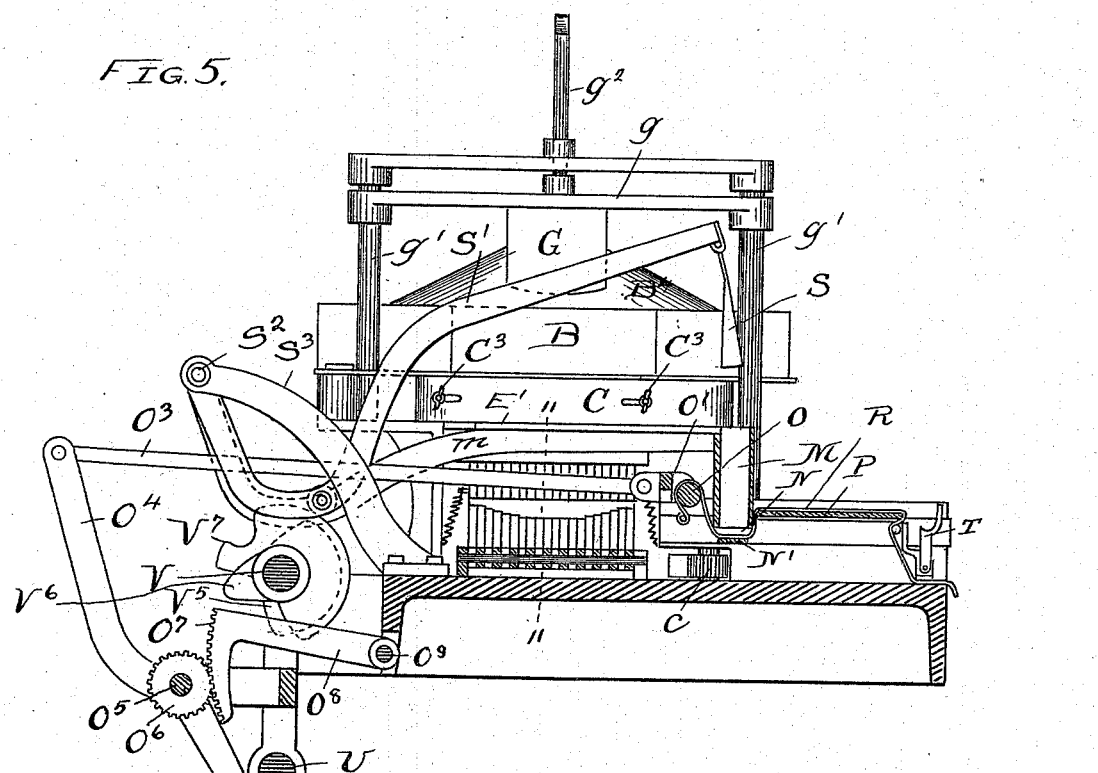
Figure 6:
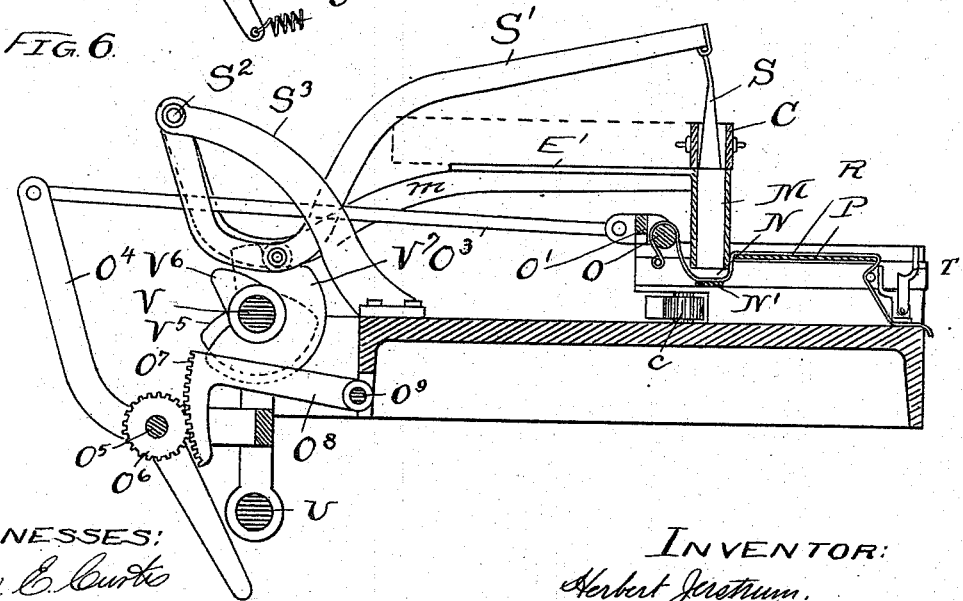
Figure 11:
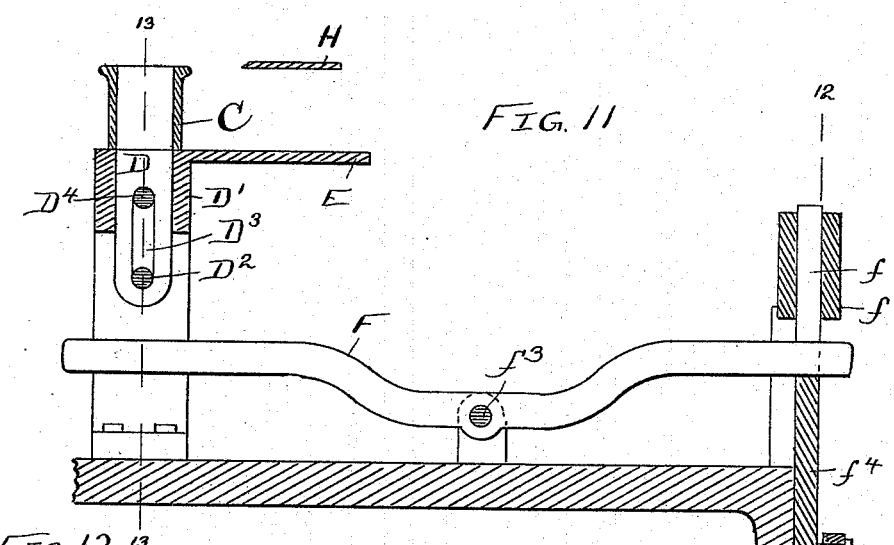
Figure 12:
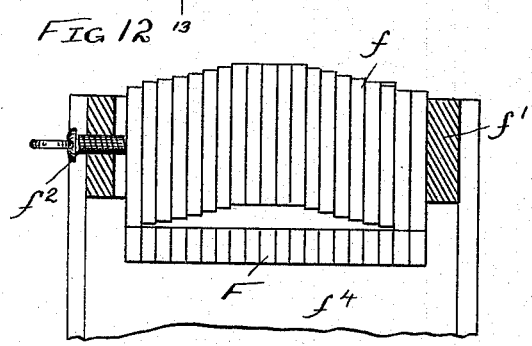
Figure 9:
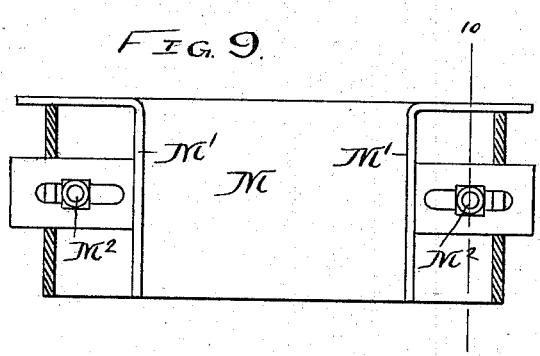
Figure 10:
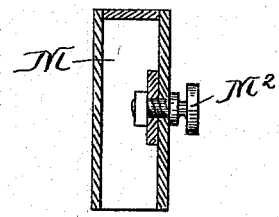

In the accompanying drawings, which form a part of this specification, and in which similar letters of reference indicate like parts throughout all the figures, Figure 1 is a front elevation partly in section of a machine embodying my invention. Fig. 2 is a side elevation; Fig. 3, a plan; Fig. 4, a horizontal section on the line 4—4 of Fig. 1. Fig. 5 is a vertical section on the broken line 5—5 of Fig. 3. Figs. 6, 7, and 8 are detail views similar to Fig. 5 illustrating a portion of the operation, and showing the parts in different positions. Fig. 9 is a detail sectional view of the guide, showing its adjustable end pieces to accommodate bunches of different lengths. Fig. 10 is a section on the line 10—10 of Fig. 9. Fig. 11 is a section on the line 11—11 of Fig. 5. Fig. 12 is a section on the line 12—12 of Fig. 11. Fig. 13 is a section on the line 13—13 of Fig. 11, showing the movable sectional bottom of the charger in the normal position. Fig. 14 is a view similar to Fig. 13, showing the sectional bottom in the curved or bellied form while the knife severs the bunch from the surplus material. Fig. 15 is a detail plan view of the charger and the knife, the view looking down from line 15—15 of Fig. 13. Fig. 16 is a detail bottom view of certain parts hereinafter described. Fig. 17 is a detail plan view of the bottom plate upon which the series of intermittently moving hoppers revolve; showing also the knife. Fig. 18 is a vertical sectional view across the hoppers and through the shaft $B^3$ of Fig. 3. Fig. 19 is a detached view in plan of the hoppers B with the reservoir $B^5$ and cone $B^4$ removed.

In the drawings I have shown one good form, and that which I believe to be the best form now known to me of reducing my invention to practice.

In the drawings A represents the frame of the machine.

B is an intermittently revolving hopper, there being preferably seven of these hoppers arranged in the form of a regular polygon. The hoppers B have no bottom, but revolve upon a stationary plate B' which constitutes the bottom of the hoppers except at the discharge position where this plate has a notch $B^2$.

$B^3$ is a shaft to which the seven revolving hoppers B are secured and by which they are revolved.

$B^4$ is a cone or dome secured to the shaft $B^3$ and to the inner walls of each of the hoppers B. This cone, in connection with the reservoir $B^5$, constitutes an automatic feed to the individual hoppers B when short fillers are being used. The reservoir $B^5$ is adjustably supported by the bracket $B^6$ and set screws $B^7$, so that by raising or lowering the lower edge of the reservoir above the surface of the cone or pyramid $B^4$ the feed of the short fillers in the reservoir may be adjusted or regulated as desired. As the cone $B^4$ revolves under the stationary reservoir $B^5$ and the mass of short fillers therein the same will feed slowly into the hoppers B. When long fillers are being used they are to be fed by hand into the individual hoppers B B as the same revolve intermittently.

C is the movable charger, the same having preferably a swinging or pivotal movement, and secured to the vertical rock shaft C'. This charger is furnished with adjustable end pieces $C^2$ $C^2$, which may be slipped in or out and fixed by the set screw $C^3$ to vary the length of the charger as may be required in the manufacture of cigars of different lengths. This movable or swinging charger serves, in connection with its movable, adjustable or sectional bottom to measure or regulate the amount of material for each bunch. It may be, and is preferably, also used to convey the fillings for the bunch from the hopper to the funnel. The movable bottom is made in a series of separately movable sections D, D, D; and they are mounted in a suitable guide or case D' in which they slide up and down as required. They are normally held in their even, flat or level position, as shown in Fig. 13, by a spring actuated bar $D^2$ which passes through slots $D^3$ formed in the sections D. The springs $D^{30}$ $D^{30}$ which actuate this bar are attached to the frame. A stop bar $D^4$ secured to the frame and passing through the slotted opening in the sectional sections D serves to limit the downward movement of the sections D and of the spring actuated bar $D^2$. This stop bar holds the movable sections D normally on the level of the table or shelf E, so as to permit the charger C to move or swing laterally over this shelf at the proper time.

F F are the separately or individually adjustable levers, one for each of the sections D, for operating said sections, and causing them to assume the curved or bellied form indicated in Fig. 14, at the time the cigar fillings are being compressed or held by the plunger G and severed from the surplus material in the hopper B. The levers F may be adjusted as desired for long or short cigars, or to give a greater or less curvature or belly to the bunch or cigar.

The plunger G serves to push the fillings from the hopper B into the charger C, and to compress the same against the bellied bottom of the charger and hold the same compressed against such bellied bottom while the knife H severs the fillings, in measured and properly compressed and properly distributed quantity, from the surplus filling material in the hopper.

The knife H is secured to a vertical rock shaft H' so that it may swing in a horizontal plane or at right angles to the plunger G, and it serves to sever the measured fillings from the surplus material, as before stated, and also to form a temporary or removable bottom for each of the hoppers B in turn at the notch $B^2$ in the plate B' while the charger C is swinging over the table E to convey the severed fillings from one of the hoppers B to the guide M and while the charger returns or swings back under the hopper B. To enable the knife to perform this function, it is made of a broad thin blade, and is adapted to shut or fit under the plate B' and just over the upper surface of the charger C. The shelf over which the charger swings is preferably made in two separate parts or sections E and E', the part E being preferably fixed to the stationary frame, and the part E' being preferably movable and fixed to the movable guide M. The guide M is furnished with adjustable end sections M' M', which may be set in or out to accommodate fillings for long or short cigars by the set screws $M^2$. The guide serves to guide the fillings into the cavity N between the bunching roller O and the inner end of the rolling table P, or rather into the sag or pocket of the apron R which is shoved into the cavity by the lower edge of the guide. The cavity N is the open space between the bunching roller O and the inner end of the table P and which receives the slack of the apron R. The guide M has an up and down movement to force the surplus fold of the apron R into the cavity N and also in order to get out of the way of the forward movement of the bunching roller O, when it moves forward over the table to roll the binder around the filler, and thus complete the bunch.

S is the discharger which serves to push the filler material out of the charger C through the guide M into the sag or pocket of the apron in the cavity N. It has an up and down movement independent of the guide M.

T is a movable spring held rest or device for receiving and holding temporarily the finished bunch as it is discharged from the apron at the outer end of the table P.

The cavity N preferably has simply a curved bottom plate N' without any side other than the inner end edge of the table.

U is the driving shaft furnished with the driving pulley U' and V is the cam shaft.

The requisite movements may be imparted to the several movable parts or devices by any suitable means or mechanism. Though this connecting or motion imparting mechanism may be greatly varied without altering the principle or mode of operation of my invention, that shown in the drawings is what I have specially devised and consider the best and simplest for the purpose.

The requisite intermittently revolving movement is given to the series of hoppers B to move them step by step into the position under the plunger G by means of a ratchet $b$ on the shaft $B^3$ which is engaged by a pawl $b'$ on the horizontally vibrating lever $b^2$ pivoted at $b^3$ to the frame and which is actuated by a cam $V'$ on the cam shaft V.

The horizontally vibrating or swinging charger C is moved at intervals from the receiving position under the hopper B to the discharging position over the guide M by means of a gear $c$ on the rock shaft $C'$ of said charger, which engages a segment rack $c'$ on the vibrating lever $b^2$. To insure the throwing and holding of the charger C in proper registry with the hopper B and guide M, I secure to the lower end of the rock shaft $C'$ a notched disk $c^2$, in the notch of which fits the end of a spring $c^3$ carried by a lever $c^4$, pivoted at one end to the lever $b^2$ and having its fulcrum pivot $c^5$ on a bracket $c^6$ secured to the frame. This spring lever thus serves to take up all slack in the gear and rack $c\ c'$; as the tension of the spring tends to hold or throw the charger C toward both limits of its movement, as clearly illustrated in Fig. 16.

The intermittently adjustable levers F which operate the individually movable sections D, constituting the movable sectional bottom of the charger C, are adjusted to give a greater or less curvature or belly to the bottom by means of adjusting pins or slides $f$ which fit in a clamp case $f'$, the same being held firmly in any position to which they may be adjusted by the clamp screw $f^2$. By employing this series of flat pins and clamp case I avoid the expense and trouble incident to the use of a large number of adjusting screws, and the inconvenience due to the screws working loose. The levers F are pivoted by a cross pin $f^3$ to the frame of the machine, and they are vibrated up and down by contact with the adjusting pins or bars $f$. The inner ends of the levers F bear against the removable bottom sections D, and thus operate the same. The levers F are operated or vibrated up and down by means of a slide $f^4$ to which the clamp case $f'$ is secured, this slide being moved up and down by a lever $f^5$ pivoted to the frame at $f^6$ and actuated by a cam $V^2$ on the cam shaft V. The lever $f^5$ is pivotally connected to the slide $f^4$ by a pin passing through a slot in said lever as is clearly indicated in Fig. 17 in connection with Figs. 2, 3 and 4.

The bar $D^2$ by means of the springs $D^{30}$ draws the sections D downward to their seat upon the stop bar $D^4$ when said sections D are not engaged by the levers F. When the levers F are operated by engagement with the adjusting pins $f$ in the clamp case $f'$ carried by the slide $f^4$ which is operated by the levers $f^5$, the sections D D assume the position shown in Fig. 14. It will of course be understood that the levers F simply impinge against the pin $f$ and are free to be actuated by the springs $D^{30}$ when not in engagement with said pins $f$.

The plunger G is operated by a cross head $g$, sliding on the upright guides $g'$, and connected by the screw threaded adjusting stem $g^2$ with the vibrating lever $g^3$ pivoted at $g^4$ to the standard $g^5$, and connected by a pivoted link $g^6$ with the lever $g^7$ pivoted at $f^6$ which is operated by cam $V^{10}$ on the cam shaft V.

The horizontally vibrating knife H is operated by an arm $h$ on its rock shaft $H'$, and which is engaged by the cam $V^4$ on the cam shaft V.

The guide M and the section $E'$ of the shelf E secured thereto, are moved up and down as required by means of a lever $m$, pivoted at $m'$ to an arm $m^2$ secured to the frame, the lever being furnished with a pin or roller $m^3$ that rests upon and is actuated by a cam $V^5$ on the cam shaft V.

The bunching roller O and with it the apron R passing over the roller, are operated by a slide $O'$ upon which the roller is journaled, and which is moved back and forth on suitable guides $O^2$ on the frame by means of a pivoted link $O^3$, connected to the vibrating lever $O^4$ on the rock shaft $O^5$, which carries a gear $O^6$ engaged by a segment rack $O^7$ on the lever $O^8$ pivoted to the frame $O^9$ and actuated by the cam $V^6$ on the cam shaft V. The lever $O^7$ has a spring $O^{10}$ at its lower end, which serves to retract the roller carrying slide $O'$.

The discharger S which pushes the filler from the charger C through the guide M into the pocket of the apron in the cavity N is operated by a slide $S'$ pivoted at $S^2$ to an arm $S^3$ on the frame, and furnished with a pin or roller $S^4$ resting upon and actuated by the cam $V^7$ on the cam shaft V.

The rest or receiving device T consists preferably of two pivoted arms connected together by a spring $T'$ secured to the bracket T to which the arms are pivoted.

The rolling apron R passes over the rolling table P and the bunching roller O and one end of it is secured to the stationary frame of the machine by a suitable pin or bar located beneath the bunching roller O when the same is in its retracted position as shown in Fig. 5, and the other end of the apron R is secured in a similar, or any suitable way, to the frame of the machine at the outer end of the table P and beneath the same as is clearly indicated in the drawings at Figs. 5 and 6. The slack, sag or pocket in the apron when the bunching roller O is retracted rests in the cavity N as is clearly shown in Figs.

5, 6, and 7. When the bunching roller O moves forward over the table P, the sag or pocket in the apron envelops and rolls the bunch, as is clearly indicated in Fig. 8.

The operation is as follows: By the revolving movement of the cone $B^4$ in connection with the stationary reservoir $B^5$, the filling material is automatically fed into the series of intermittently revolving hoppers B B. Each of the hoppers B is brought in turn over the notch or opening $B^2$ in the plate B′ and into registry with the charger C. The compressing plunger G descends and pushes the fillings through the hopper B into the charger C and compresses the same against the sectional bottom. The compressing plunger G then begins to rise and the sectional bottom is raised more rapidly than the plunger and caused to assume the curved or bellied form shown in Fig. 14. While the fillings are thus compressed between the curved or bellied bottom of the charger and the compressing plunger G, the knife H swings horizontally and severs the fillings from the surplus material in the hopper B, the knife also then serving to support the surplus material in the hopper B as indicated in Fig. 14. The plunger G is then withdrawn and all the sections D of the sectional bottom of the charger again assume a level form, and then the charger C swings over the shelf E E′ and conveys the charge of fillings over the movable guide or device M which guides the charge of fillings from the charger into the apron. The discharger S then operates to push the charge of fillings from the charger C through the guide M into the slack or pocket portion of the apron which occupies the cavity N. The discharger S and guide M are then withdrawn and the bunching roller O moves forward and causes the apron R to roll the bunch over the table P. Though the roller O is cylindrical and the table P flat, the bunch produced will be of the bellied or double tapered form, because the major portion of the fillings are in the middle or central portion owing to the curved or bellied form of the sectional bottom at the time the knife operates; and the subsequent operation of the machine is not such as to change the position of this denser portion of the bunch or to redistribute the material throughout the length of the bunch. At the time the charger C moves into position under the hopper B or compressing plunger, and also at the time when the charger C swings from such position into registry with the funnel or guide M and cavity N, the sectional bottom of the charger which has no swinging movement is caused to assume its level position to properly permit these movements of the charger.

It will be noticed in Fig. 14 that the middle sections D D of the bottom are bellied or depressed below the level of the outer or end sections of the bottom, that is to say that the middle portion of the bottom is depressed in respect to the outer portion.

The several hoppers B of the series are separated from each other by cross bars extending between and connecting the sides of the several bottomless hoppers at the ends thereof as indicated in Fig. 19.

I claim—

1. In a cigar bunching machine, the combination of the following parts or elements: a series of intermittently movable hoppers; a movable charger; a movable adjustable sectional bottom for such charger; a compressing plunger to force the filler from each of said hoppers in turn into the charger; a knife; a movable guide; a plate or shelf extending from the hopper to the guide; a rolling table, bunching roller and rolling apron, a cavity for the pocket of the apron, and a movable discharger to force the filler from the charger through the guide into the pocket of the apron in the pocket cavity, substantially as specified.

2. In a cigar bunching machine, the combination of a charger with a compressing plunger to compress the tobacco into the charger, and a movable sectional bottom for the charger, the several sections of said bottom having parallel faces so that they may be brought into the same plane, means for operating said compressing plunger and the movable sectional bottom of the charger substantially as specified.

3. In a cigar bunching machine, the combination of the charger and compressing plunger of a bottom for the charger made in two or more sections, one or more of said sections being individually movable in respect to the other, the several sections of said bottom having parallel faces so that they may be brought into the same plane, means for operating said compressing plunger and the movable sectional bottom of the charger substantially as specified.

4. In a cigar bunch machine the combination of the charger and compressing plunger, with a bottom for the charger made in two or more sections, one or more of said sections being independently adjustable in respect to the other, and means for operating said compressing plunger and the movable sectional bottom of the charger, substantially as specified.

5. In a cigar bunching machine, the combination with a movable charger, of a shelf over which the charger is moved, a compressing plunger for compressing the tobacco in the charger, a knife, a movable sectional bottom for the charger, whereby the middle portion of the bottom may be depressed at the time the filler is being compressed by the plunger and separated by the knife and again moved flush with the remainder of the bottom when the charger swings over said plate or shelf and means for depressing and elevating the bottom of the charger, substantially as specified.

6. In a cigar bunching machine, the combination of a hopper with a movable charger, of a shelf over which the charger is moved, a compressing plunger for compressing the tobacco in the charger, a knife, a movable sectional bottom for the charger, whereby the middle portion of the bottom may be depressed at the time the filler is being compressed by the plunger and separated by the knife and again moved flush with the remainder of the bottom when the charger swings over said plate or shelf and means for depressing and elevating the bottom of the charger, substantially as specified.

7. In a cigar bunching machine, the combination with a movable charger, of a shelf over which the charger is moved, a compressing plunger for compressing the tobacco in the charger, a knife, a movable and adjustable sectional bottom for the charger, whereby the middle portion of the bottom may be depressed at the time the filler is being compressed by the plunger and separated by the knife and again moved flush with the remainder of the bottom when the charger swings over said plate or shelf and means for depressing and elevating the bottom of the charger, substantially as specified.

8. In a cigar bunching machine, the combination of a hopper with a movable charger, of a plate or shelf over which the charger is moved, a compressing plunger for compressing the tobacco in the charger, a knife, a movable sectional bottom for the charger, whereby the middle portion of the bottom may be depressed at the time the filler is being compressed by the plunger and separated by the knife and again moved flush with the remainder of the bottom when the charger swings over said plate or shelf, a movable funnel, said table having a movable section E' secured to said funnel and means for depressing and elevating the bottom of the charger, substantially as specified.

9. In a cigar bunch machine, the combination of a hopper, with a movable charger furnished with adjustable end sections, a movable sectional bottom for said charger, a compressing plunger, a shelf over which the charger swings, a movable guide provided with adjustable end sections, and a discharger for forcing the filler from the charger through the guide and means for depressing and elevating the bottom of the charger, substantially as specified.

10. In a cigar bunch machine, the combination of a hopper, with a movable charger furnished with adjustable end sections, a movable sectional bottom for said charger, a compressing plunger, a shelf over which the charger swings, a movable guide provided with adjustable end sections, a discharger for forcing the filler from the charger through the guide, a rolling table, a rolling apron, a bunching roller and a cavity for the pocket or sag of the apron and means for depressing and elevating the bottom of the charger, substantially as specified.

11. In a cigar bunch machine, the combination of the movable charger, with a rack and gear for moving the same into position, a spring for taking up the lost motion and insuring the throwing and holding of the charge in position, a compressing plunger, a bottom for said charger, a hopper, a guide M, a rolling apron and bunching roller, a discharge to force the filler from the charger through the guide into the pocket of the apron, said spring operating to throw and hold said movable charger in position both in respect to said hopper and in respect to said guide and means for depressing and elevating the bottom of the charger, substantially as specified.

12. The combination of charger C, rock shaft C', a rack and gear for operating said rock shaft, the vibrating lever carrying the rack, the notched disk on the rock shaft, and the vibrating lever $c^4$ furnished with a spring $c^3$ engaging said notched disk for taking up the lost motion and throwing or holding said charger in position, substantially as specified.

13. The combination of the charger C, with the movable and adjustable sectional bottom for said charger, means for compressing the fillings in the charger while the sectional bottom is in a curved or bellied form and a knife or means for severing the charge from the surplus material while said sectional bottom is in a curved or bellied form, substantially as specified.

14. The combination of the charger C, with the movable and adjustable sectional bottom for said charger, and a series of levers F each connected to a section of the bottom and means for adjusting and operating said levers, substantially as specified.

15. The combination of the charger C, with the movable and adjustable sectional bottom D for said charger, a series of levers F, and a series of adjusting devices $f$ for said levers, substantially as specified.

16. The combination with the charger C, of the movable and adjustable sectional bottom D for said charger, a series of levers F and a series of adjusting devices $f$ for said levers, said adjusting devices comprising a series of independently movable pins, and a clamp case and clamp screw, substantially as specified.

17. The combination of the charger C, with the movable and adjustable sectional bottom for said charger, the sections D of said bottom having slots $D^3$, a guide case D' for said sections, and a spring actuated bar $D^2$ for holding said sections normally in a level position, and means for limiting the movement of said sections, substantially as specified.

18. The combination with the charger C, of the movable and adjustable sectional bottom for said charger, the sections D of said bottom having slots $D^3$, a guide case D' for said sections, a spring actuated bar $D^2$ for holding said sections normally in a level position, and a stop bar $D^4$ to limit the movement of said sections D, substantially as specified.

19. The combination with the charger C, of the movable and adjustable sectional bottom for said charger, the sections D of said bottom having slots $D^3$, a guide case $D'$ for said sections, a spring actuated bar $D^2$ for holding said sections normally in a level position, means for limiting the movement of said sections and a series of independently movable levers F for operating said sections D, substantially as specified.

20. In a cigar bunch machine, the combination of a hopper, with a movable charger, a bottom for said charger composed of independently movable sections, a compressing plunger over the hopper, a movable knife, a movable guide, a shelf over which the charger swings, a rolling table, a cavity for the pocket of the apron, a bunching roller, a rolling apron, and a discharger to force the filler from the charger through the guide into the pocket, substantially as specified.

21. In a cigar bunch machine, the combination of a hopper, with a movable charger, a bottom for said charger composed of independently movable sections, a compressing plunger over the hopper, a movable knife, a movable guide, a shelf over which the charger swings, a rolling table, a cavity for the pocket of the apron, a bunching roller, a rolling apron, and a discharger to force the filler from the charger through the guide into the pocket, said shelf having a movable part secured to said guide and means for depressing and elevating the bottom of the charger, substantially as specified.

22. In a cigar bunch machine, the combination of a movable charger, a bottom for said charger composed of independently movable sections, a compressing plunger, a movable knife, a movable guide, a shelf over which the charger swings, a rolling table, a cavity for the pocket of the apron, a bunching roller, a rolling apron, and a discharger to force the filler from the charger through the guide into the pocket and means for depressing and elevating the bottom of the charger, substantially as specified.

23. In a cigar bunch machine, the combination of a horizontally swinging charger, with a vertically movable guide into register with which the charger is brought, the rolling apron, and bunching roller, a discharge to force the filler from the charger through the guide into the pocket of the apron substantially as specified.

24. In a cigar bunch machine, the combination of the following parts or elements: a series of intermittently movable hoppers; a movable charger; a movable adjustable sectional bottom for such charger; a compressing plunger to force the filler from the hopper into the charger; a knife; a movable guide; a shelf extending from the hopper to the guide, a rolling table, a cavity for the pocket of the apron, a bunching roller and rolling apron a movable discharger to force the filler from the charger through the guide into the pocket, and a reservoir $B^5$ and cone or pyramid $B^4$ forming the bottom of the reservoir and means for depressing and elevating the bottom of the charger, substantially as specified.

25. In a cigar bunching machine, the combination of the following parts or elements; a series of intermittently movable hoppers; a movable charger; a movable adjustable sectional bottom for such charger; a compressing plunger to force the filler from the hopper into the charger; a knife; a movable guide; a shelf extending from the hopper to the guide, a rolling table, a cavity for the pocket of the apron, a bunching roller and rolling apron, a movable discharger to force the filler from the charger through the guide into the pocket, and mechanism for operating said parts and means for depressing and elevating the bottom of the charger, substantially as specified.

26. In a cigar bunch machine, the combination of the stationary plate $B'$ furnished with notch $B^2$, with a series of intermittently revolving bottomless hoppers B, a charger C, a bottom for said charger, and a compressing plunger G, substantially as specified.

27. In a cigar bunch machine, the combination of the stationary plate $B'$ furnished with a notch $B^2$, with a series of intermittently revolving bottomless hoppers B, a movable charger C, a movable sectional bottom for said charger, a compressing plunger G, and knife H serving to sever the bunch from the surplus material in the hopper and also as a removable temporary bottom for the hopper at said notch, and means for depressing and elevating the bottom of the charger, substantially as specified.

28. In a cigar bunch machine, the combination of the stationary plate $B'$ furnished with a notch $B^2$, with a series of intermittently revolving bottomless hoppers B, a movable charger C, a movable sectional bottom for said charger, a compressing plunger G, a knife H serving to sever the bunch from the surplus material in the hopper and also as a removable temporary bottom for the hopper at said notch, a guide M and shelf E, substantially as specified.

HERBERT JERSTRUM.

Witnesses:
H. M. MUNDAY,
EMMA HACK.